United States Patent [19]

Dischert

[11] Patent Number: 4,493,070
[45] Date of Patent: Jan. 8, 1985

[54] VIDEO DISC PLAYER HAVING CARRIAGE DRIVE MECHANISM

[75] Inventor: William A. Dischert, Jobstown, N.J.

[73] Assignee: RCA Corporation, New York, N.Y.

[21] Appl. No.: 607,880

[22] Filed: May 7, 1984

[51] Int. Cl.³ ............... G11B 17/06; G11B 21/04
[52] U.S. Cl. .................... 369/77.2; 369/219; 369/221
[58] Field of Search ............ 369/77.2, 219, 220, 369/221

[56] References Cited

U.S. PATENT DOCUMENTS

| | | | |
|---|---|---|---|
| 3,000,638 | 9/1961 | Dennis | 369/221 |
| 3,870,835 | 5/1975 | Stave | 369/223 |
| 3,993,316 | 11/1976 | Fairbanks | 369/220 |
| 4,191,381 | 3/1980 | Stave | 369/77.2 |
| 4,196,906 | 4/1980 | Torrington | 369/77.2 |
| 4,216,969 | 8/1980 | Allen | 369/77.2 |
| 4,220,340 | 9/1980 | Torrington et al. | 369/249 |
| 4,249,746 | 2/1981 | Mimasu | 369/221 |
| 4,321,702 | 3/1982 | Hughes | 369/219 |
| 4,325,136 | 4/1982 | O'Connell et al. | 369/219 |
| 4,351,046 | 9/1982 | Elliot | 369/77.2 |
| 4,390,978 | 6/1983 | Pollack | 369/220 |
| 4,426,695 | 1/1984 | Moriki et al. | 369/77.2 |

Primary Examiner—Steven L. Stephan
Attorney, Agent, or Firm—Eugene M. Whitacre; Eric P. Herrmann; Dilip A. Kulkarni

[57] ABSTRACT

As an empty caddy is inserted into a video disc player to retrieve a record retained inside the player, it engages and drives back a pickup carriage to its starting position at the rear of the player. As this happens, a coil spring, connected to the carriage, is stretched such that it urges the carriage to move toward the front of the player. During playback, a timing mechanism coupled to the carriage controls the rate of travel by means of an escapement of the carriage under the influence of the coil spring.

8 Claims, 6 Drawing Figures

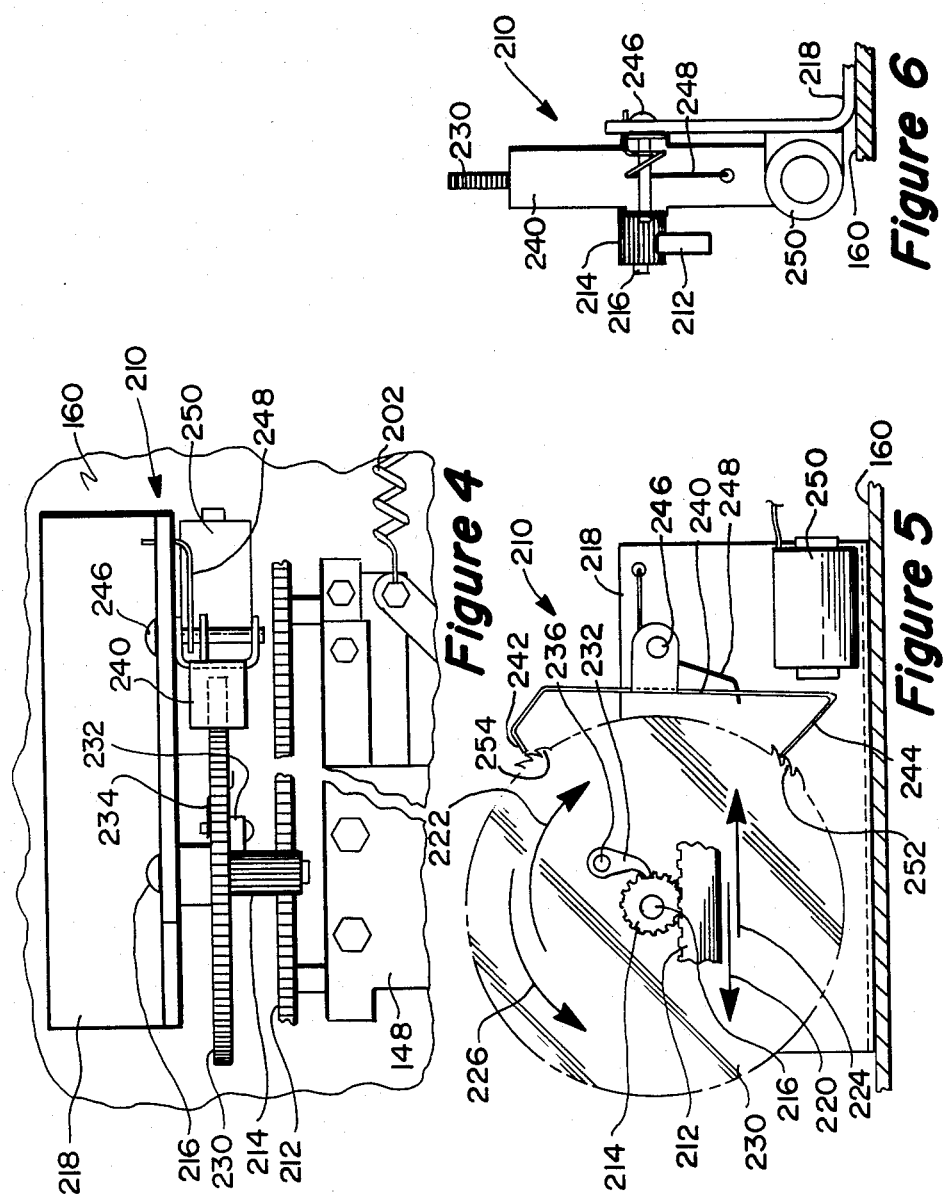

VIDEO DISC PLAYER HAVING CARRIAGE DRIVE MECHANISM

This invention relates to a disc record player, and more particularly, to an inexpensive carriage drive mechanism for a disc record player enploying a record caddy for the purpose of loading a record into the player and unloading it therefrom.

In certain systems, picture and sound signals are stored on a disc record in the form of physical undulations in a continuous spiral track disposed on the record surface. The variations in electrical capacitance between an electrode defined by a record-engaging stylus and a conductive property of the record are sensed as the physical undulations on the record surface pass beneath the stylus tip. The capacitive variations are converted into electrical signals suitable for application to a conventional television receiver. A capacitance-type pickup system is illustratively disclosed in U.S. Pat. No. 3,842,194 (Clemens).

Typically, a video disc record is housed in a protective caddy which comprises an outer jacket and a record retaining spine. The spine is provided with an opening in which a record is received, thereby forming a record/spine assembly. To load a record into a player, a fully caddy is inserted into the player along a pair of guide rails provided in the player. A record extraction mechanism disposed in the player removes the record/spine assembly from the jacket for retention in the player on a set of receiving pads during subsequent jacket withdrawal. To transfer the record to the turntable for playback, the turntable is raised relative to the receiving pads. The player is provided with hold-down members which hold the spine in place while allowing the record to be picked up by the turntable when it is raised. During playback, the pickup stylus is traversed radially across the record while the turntable revolves the record at the desired speed (e.g., 450 rpm). For record retrieval, the record is transferred back to the receiving pads by lowering the turntable with respect to the receiving pads to redefine the record/spine assembly. An empty jacket is then reinserted into the player, whereby the record/spine assembly is retrieved into the jacket.

The pickup stylus is, typically, disposed at one end of a stylus arm having the other end secured to a protective cartridge by means of a flexible coupler. The flexible coupler allows the stylus to follow the vertical and horizontal movements of the record surface (e.g., warp, eccentricity, etc.). The pickup cartridge is mounted in a translatable carriage having an opening in the bottom wall thereof through which the pickup stylus protrudes for record engagement when lowered. During playback, the carriage is translated from a starting position at the back of the player toward the record center so as to follow the radially inward motion of the stylus. U.S. Pat. No. 4,390,978 (Pollack) describes a suitable carriage drive mechanism.

The carriage is reset to the starting position during a caddy insertion. As an empty caddy is inserted into the player for record retrieval, the front edge thereof engages the carriage to drive it back to a preset limit stop defining the starting position. U.S. Pat. No. 4,321,702 (Hughes) discloses a suitable carriage reset apparatus.

The carriage drive mechanism, in accordance with this invention, includes a spring coupled to the carriage for storing energy as an empty caddy drives the carriage back to its starting position. During playback, the spring urges the carriage to travel toward the record center. A timing means is coupled to the carriage for controlling the rate of movement of the carriage during playback.

In the Drawings:

FIGS. 4, 5 and 6 respectively depict the plan view, the side view and the end view of the speed control apparatus of the subject carriage drive mechanism.

Figure 1:
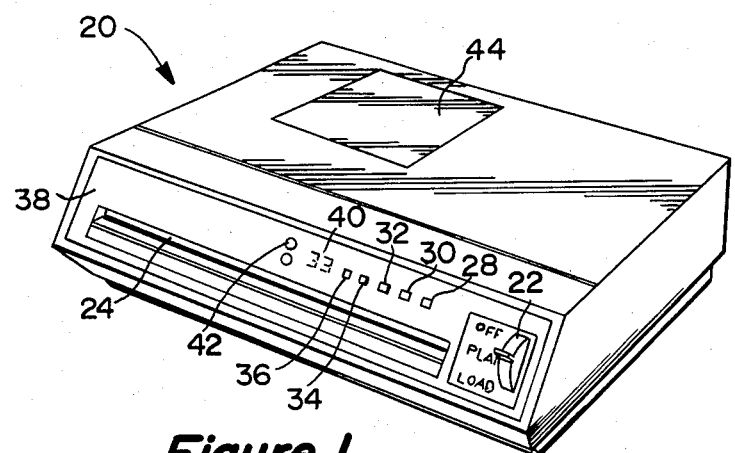
FIG. 1 is a video disc player incorporating a carriage drive mechanism in accordance with the instant invention.

Shown in FIG. 1 is a video disc player 20 incorporating the present carriage drive mechanism. A function lever 22 on the front side of the player is subject to disposition in any one of three positions—OFF, PLAY and LOAD/UNLOAD. A caddy entry door closes a caddy input slot 24 when the function lever 22 is disposed in the OFF and PLAY positions. In the LOAD/UNLOAD position of the function lever 22, the caddy entry door is opened to permit insertion of a full video disc caddy 26, shown in FIG. 2, into the player to load an enclosed record therein. A pushbutton 28 is provided to dispose the player in the "PAUSE" mode to allow the viewer to interrupt the program for as long as desired without missing any of the program content. In the PAUSE mode, the pickup device is raised and its lateral motion is arrested. A set of pushbuttons 30, 32, 34 and 36 are arranged on the instrument panel 38 to dispose the player in any one of four "SEARCH" modes, i.e., rapid access and visual search, to permit the viewer to quickly locate a precise section of the prerecorded program. During rapid access, the pickup device is lifted, and rapidly moved sideways. In visual search, the pickup device is rapidly moved sideways while in engagement with the record to permit live search. A digital LED readout 40 provides an indication of playing time and other functions, such as PAUSE, LOAD/UNLOAD and END-OF-PLAY, etc. A pair of tally lights 42 are operated to provide an indication of the record side subject to play—e.g., "SIDE 1" and "SIDE 2". A removable door 44 is disposed on the cover of the player to provide access to a stylus cartridge 46, shown in FIG. 3, so that it can be changed when required.

Figure 2:
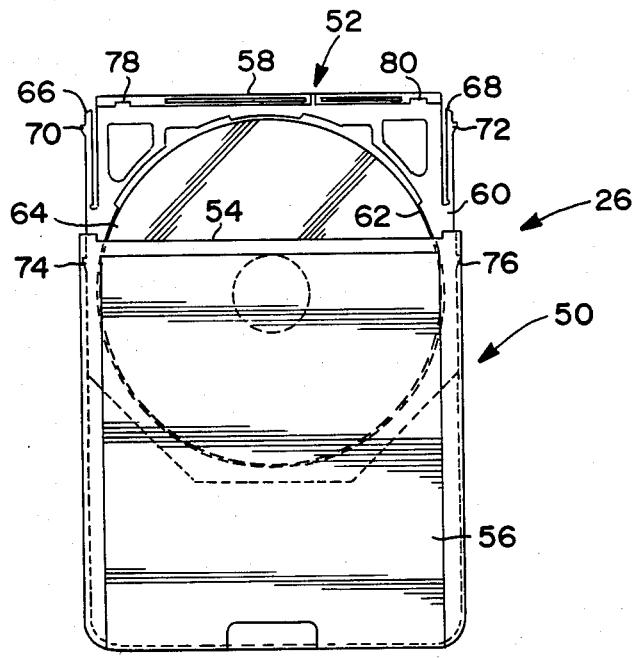
FIG. 2 shows a video disc caddy suitable for use with the player of FIG. 1.

As shown in FIG. 2, the video disc caddy 26 comprises a jacket 50 and a record retaining spine 52. The jacket 50 has an edge opening 54 in communication with a cavity 56 for enclosing a record/spine assembly. The spine 52 has a portion 58 which serves as a closure, and a further portion 60 having a circular opening 62 for receiving a centrally-apertured, spirally-grooved record 64. The spine 52 is further fitted with integrally-molded, flexural latch fingers 66 and 68. Each of the spine latch fingers 66 and 68 has a protruding element 70 and 72. The protruding elements 70 and 72 are received in pockets 74 and 76 disposed in the jacket 50 for capturing the spine 52 when it is fully seated therein. The spine 52 is provided with cutouts 78 and 80 for selectively receiving a pair of spine gripper members mounted in the player to secure the spine thereto in the manner explained later.

Figure 3:
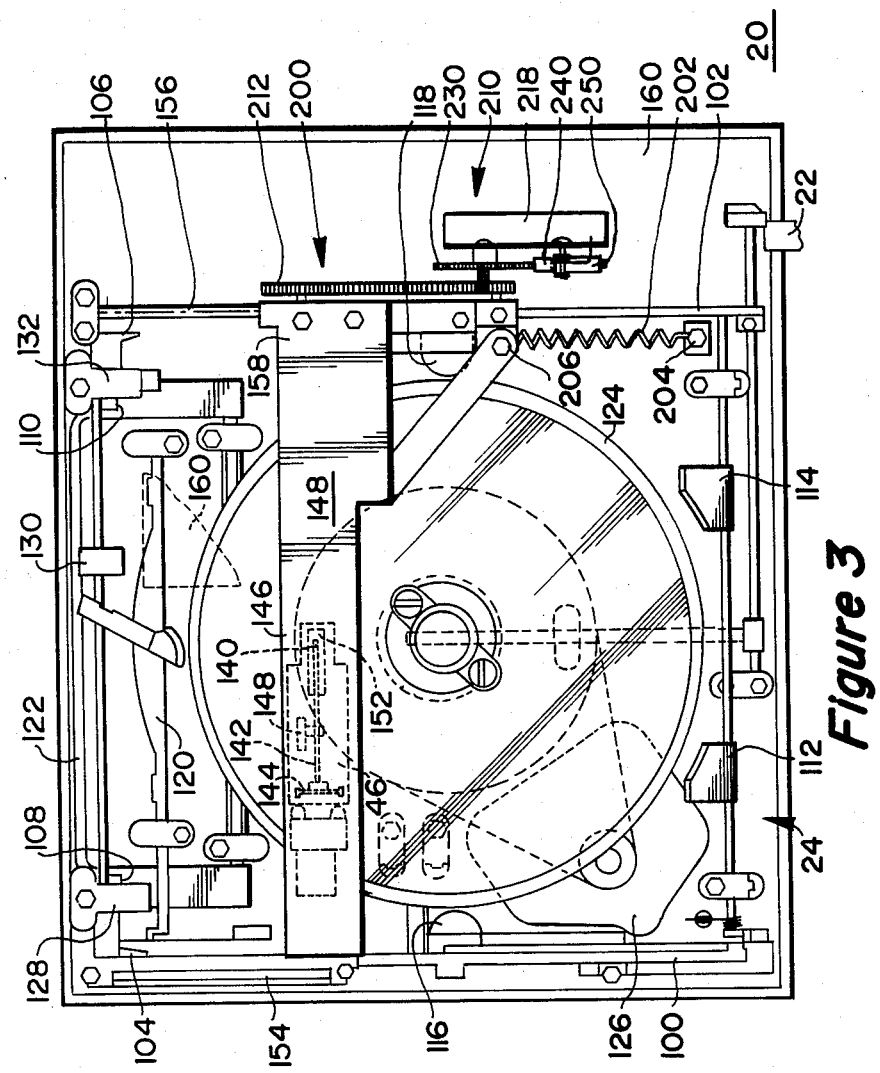
FIG. 3 represents a plan view of the player of FIG. 1 with its cover removed to show the details of the present carriage drive mechanism.

The operation of a record loading/unloading mechanism provided in the player will be explained in conjunction with FIG. 3. To insert a record into the player, a loaded caddy 26 is guided into the input slot 24 along a path defined by side rails 100 and 102. As the caddy arrives at a fully inserted position in the player, latch defeat members 104 and 106 enter the jacket 50 to defeat the spine latch fingers 66 and 68, thereby freeing the spine 52 from the jacket. Pivotally mounted in the player are spine gripper members 108 and 110 which are received in the respective cutouts 78 and 80, arranged in the spine 52, when the caddy arrives at the fully inserted position in the player in order to lock the spine to the player. Since the spine 52 is released from the jacket 50 through the operation of the latch defeat members 104 and 106 and is latched to the player through the operation of the spin gripper members 108 and 110, subsequent withdrawal of the jacket leaves the record/spine assembly in the player. The retained record/spine assembly is supported on a set of depressible receiving pads 112, 114, 116, 118 and 120. A pair of springs (not shown) disposed between a gripper arm 122, which carries the spine gripper members 108 and 110, and the latch defeat members 104 and 106 effect downward deflection of the latch defeat members upon jacket withdrawal.

To transfer the retained record to a turntable 124, the function lever 22 is displaced to the PLAY position, which, in turn, raises the turntable and starts a turntable motor 126. A set of hold-down members 128, 130 and 132 hold the retained spine 52 in place against the receiving pads 112, 114, 116, 118 and 120 while permitting the retained record to be intercepted by the turntable 124 when it is raised. The hold-down members 128, 130 and 132 also serve to accurately locate the retained spine 52, longitudinally and laterally, in the player.

A pickup stylus 140 is disposed at one end of a stylus arm 142, the other end of which is suspended in the cartridge 46 by means of a flexible rubber coupler 144. The cartridge 46 is placed in a compartment 146 provided in a stylus arm carriage 148. A stylus arm lifter 150 is mounted in the carriage 148 to selectively lower the pickup stylus 140 through an opening 152 provided in the bottom wall of the carriage to effect record engagement. During playback, a carriage drive mechanism 200, pursuant to the instant invention, drives the carriage 148 on guide ways 154 and 156 disposed parallel to the caddy side rails 100 and 102 from a starting position at the back of the player toward the front of the player in synchronism with the radially inward motion of the groove-guided pickup stylus 140. The operation of the subject carriage drive mechanism 200 will be explained in detail subsequently.

During playback, the variations in electrical capacitance between an electrode carried by the stylus 140 and a conductive property of the record 64, in correspondence to the rises and falls of the disc surface under the stylus end, are sensed by pickup circuitry 158 to reproduce the stored information on the record. The recovered signals are processed by signal processing circuits 160 to reconstruct a television signal containing picture and sound information for application to a television receiver.

To transfer the record back to the receiving pads 112, 114, 116, 118 and 120 after playback, the function lever 22 is depressed to the LOAD/UNLOAD position, which, in turn, lowers the turntable 124 to a level below the receiving pads. When the turntable 124 is lowered, the record is deposited on the receiving pads 112, 114, 116, 118 and 120 for reception in the opening 62 disposed in the spine 52 to redefine the record/spine assembly. The turntable motor 126 is shut off when the function lever 22 is displaced to the LOAD/UNLOAD position. The location of the receiving pads 112, 114, 116, 118 and 120, occupying the raised position thereof, is such that the record/spine assembly is aligned with the center line of the caddy side rails 100 and 102.

To retrieve the record/spine assembly, the empty jacket 50 is inserted into the player through the input slot 24 along the caddy side rails 100 and 102. As the jacket 50 is driven into the player, the front edge thereof engages the carriage 148 to push it back to a preset travel limit stop defining the starting position, and it also engages the already deflected latch defeat members 104 and 106 to cause further downward deflection thereof. Such further downward deflection of the latch defeat members 104 and 106, in turn, effects downward displacement of the spine gripping members 108 and 110, whereby the spine 52 is freed from the player. When the jacket 50 is fully inserted into the player, the protruding elements 70 and 72 of the spine latch fingers 66 and 68 snap back into the pockets 74 and 76 to lock the spine 52 to the jacket. The record/spine assembly is withdrawn from the player when the caddy is extracted.

The instant carriage drive mechanism 200 will now be described in conjunction with FIGS. 3-6. FIG. 3 illustrates a plan view of the video disc player with its lid removed to show the details of the carriage drive mechanism 200. FIGS. 4, 5 and 6, respectively, depict the detailed plan view, side view and front view of the speed control portion of the subject carriage drive mechanism 200. The carriage drive mechanism 200 includes a coil spring 202 having its respective ends 204 and 206 connected to the carriage 148 and to the player housing 160. As an empty caddy 26 is inserted into the input slot 24 after playback for retrieving a record/spine assembly retained inside the player, it engages the carriage 148 to drive it back to the starting position at the rear of the player in the manner described in the afore-mentioned patent issued to Hughes (U.S. Pat. No. 4,321,702). As this happens, the coil spring 202 is stretched, whereby the carriage 148 is urged forward toward the turntable center.

The carriage drive mechanism 200 further includes a selectively-actuated speed control mechanism 210 for controlling the rate of movement of the carriage 148 during playback under the influence of the coil spring 202. The control mechanism 210 includes a rack 212 fixedly mounted to the carriage 148. The rack 212 is in engagement with a pinion 214 freely mounted on a pin 216, which is, in turn, disposed on a support bracket 218 attached to the player housing 160.

As an empty caddy is inserted into the player, the carriage-mounted rack 212 is driven toward the starting position at the rear of the player. The rearward motion of the rack 212, represented by an arrow 220 in FIG. 5, is translated into a clockwise motion of the pinion 214, indicated by an arrow 222. On the other hand, the outward motion of the carriage-mounted rack 212, depicted by an arrow 224, causes an anticlockwise motion of the pinion 214, shown by an arrow 226 in FIG. 5.

Also freely disposed on the pin 216, between the pinion 214 and the support bracket 218, is an escape wheel 230. Pivotally mounted on the escape wheel 230 is a pawl 232. A wire spring 234, depicted in FIG. 4, keeps the free end of the pawl 232 in engagement with the pinion 214. The location of the pivot 236 of the pawl 232 with respect to the location of the support pin 216 is such that the pinion 214 is allowed to rotate clockwise 222 without requiring the rotation of the escape wheel 230. The clockwise rotation of the pinion 214 in FIG. 5 merely deflects the pawl 232 out of the way against the force of the wire spring 234. In other words, the coupling between the pinion 214 and the escape wheel 230 is such that an empty caddy can be inserted into the player without requiring the rotation of the escape wheel 230.

On the other hand, the anticlockwise rotation 226 of the pinion 214 caused by outward motion 224 of the carriage 148 cannot occur without the anticlockwise motion of the escape wheel 230 because of the pawl 232. Putting it differently, the forward motion 224 of the carriage 148—for example, during playback—requires anticlockwise rotation 226 of the escape wheel 230.

To control the rate of the anticlockwise motion of the escape wheel 230 and, in turn, the rate of forward motion of the carriage 148 during playback, an escapement 240, having end portions 242 and 244 subject to engagement with the escape wheel 230, is provided. The escapement 240 is pivotally mounted on the support bracket 218 on a pin 246. A wire spring 248 urges the lower end 244 of the escapement 240 into engagement with the escape wheel 230 as indicated in FIG. 5. On the other hand, the lower end 244 of the escapement 240 is pulled away from the escape wheel 230 when a selectively-actuated electromagnet 250 is energized.

During playback, the coil spring 202 urges the carriage 148 to move forward and, in turn, urges the escape wheel 230 to rotate anticlockwise. However, the lower end 244 of the escapement 240, in engagement with a tooth 252 of the escape wheel 230, prevents the forward movement 224 of the carriage 148. Upon actuation of the electromagnet 250, the lower end 244 of the escapement 240 is pulled away from the escape wheel 230, thereby allowing the escape wheel to rotate and the carriage 148 to move forward. In the interim, the upper end 242 of the escapement 240 engages the next tooth 254 in its path, whereby the forward motion of the carriage 148 is again arrested.

When the electromagnet 250 is deenergized, the wire spring 248 pulls the upper end 242 away from the escape wheel 230, thereby releasing the carriage 148 to move forward again. As this happens, the wire spring 248 drives the lower end 244 back into engagement with the escape wheel 230 to again stop the forward motion of the carriage 148. The foregoing cycle is continuously repeated during playback at a controlled rate to allow the coil spring 202 to drive the carriage 148 forward at the desired rate. Any suitable circuit can be used to pulse the electromagnet 250 at an appropriate rate during playback.

It will be noted that the rate of movement of carriage 148 during playback can be changed by changing the parameters of the gears and by changing the rate at which the electromagnet 250 is pulsed. The arrangement described below will allow the carriage 148 to advance approximately 0.0015 inches each time the electromagnet 250 is energized or deenergized.

Pinion 214:
  pitch diameter=0.25 inches.
  12 teeth (48 diametrical pitch).
Escape wheel 230:
  pitch diameter=2.5 inches.
  250 teeth.
Pulse rate:
  one pulse for every 4 seconds.

The carriage drive mechanism 200 is, not only relatively inexpensive, but it is reliable and consistent.

What is claimed is:

1. A player for use with a record caddy; said player including a housing having an input slot into which an occupied record caddy is manually inserted in a first direction along a caddy insertion path for loading an enclosed record therein and into which an empty caddy is manually inserted for retrieving a loaded record therefrom; means for guiding caddy insertion into said housing along said caddy insertion path; a signal pickup for recovering prerecorded information from a rotatably-supported record during playback; a carriage for supporting said signal pickup; means for guiding said carriage along a second path lying substantially parallel to said caddy insertion path; apparatus for translating said carriage during playback away from a starting position along said carriage guiding means; the location of said caddy guiding means relative to that of said carriage guiding means being such that when an empty caddy is manually inserted into said player after playback for record retrieval, it engages said carriage to drive it back to said starting position; said carriage translating apparatus comprising:

(A) means coupled to said carriage for storing energy as an empty caddy engages said carriage to drive it back toward said starting position thereof in the caddy insertion direction; said energy storing means applying a force to said carriage in a sense urging its travel away from said starting position in a direction opposite to said caddy insertion direction; and (B) a selectively-actuated speed control means coupled to said carriage for controlling the rate of movement of said carriage during playback as said energy storing means drives said carriage in said opposite direction away from said starting position; said selectively-actuated speed control means allowing an empty caddy to drive said carriage back to said starting position; said control means preventing said energy storing means from driving said carriage away from said starting position until said actuation thereof.

2. The carriage translating apparatus of claim 1 wherein said energy storing means comprises a spring having its ends secured respectively to said carriage and said housing such that said spring is compressed when an empty caddy drives said carriage toward said starting position, so that said spring, in turn, drives said carriage away from said starting position during playback at the desired rate.

3. The carriage translating apparatus of claim 1 wherein said energy storing means comprises a spring having its ends secured respectively to said carriage and said housing such that said spring is tensioned when an empty caddy drives said carriage toward said starting position, so that said spring, in turn, drives said carriage at the desired rate away from said starting position during playback.

4. The carriage translating apparatus of claim 3 wherein said selectively-actuated speed control means comprises:

(A) a toothed escape wheel;
(B) one-way coupling means for connecting said toothed escape wheel with said carriage; said one-way coupling means allowing motion of said carriage toward said starting position without requiring motion of said escape wheel; said one-way coupling means, however, preventing motion of said carriage away from said starting position without requiring motion of said escape wheel; and (C) timing means coupled to said escape wheel for releasing, a seriatim, the teeth of said escape wheel at a controlled rate to allow said spring to drive said carriage away from said starting position at said desired rate during playback.

5. The carriage translating apparatus as defined in claim 4 wherein said timing means comprises:
    (A) an escapement subject to releasable engagement with said teeth of said escape wheel; and
    (B) actuating means coupled to said escapement for causing it to release said teeth of said escape wheel at said controlled rate during playback.

6. The carriage translating apparatus of claim 5 wherein said actuating means comprises a selectively-energized electromagnet.

7. The carriage translating apparatus of claim 6 wherein said one-way coupling means between said carriage and said escape wheel comprises:
    (A) a toothed rack fixedly mounted to said carriage for translation therewith;
    (B) a toothed pinion coaxially, but freely, mounted with respect to said escape wheel for engagement with said carriage-mounted rack; and
    (C) a pawl member pivotally mounted on said escape wheel for engagement with the teeth of said pinion; said pawl member allowing rotation of said pinion caused by motion of said carriage-mounted rack toward said starting position without requiring rotation of said escape wheel; said pawl member transmitting rotation of said pinion caused by motion of said carriage-mounted rack away from said starting position to said escape wheel.

8. The carriage translating apparatus of claim 7 further including means for biasing said pivotally-mounted pawl member against said teeth of said pinion.

* * * * *